United States Patent [19]

Arrigoni

[11] 4,419,539

[45] Dec. 6, 1983

[54] APPARATUS FOR PREVENTING NOISE GENERATION IN AN ELECTRICAL DIGITIZER DUE TO GENERATION OF OPTICAL SIGNALS

[75] Inventor: David M. Arrigoni, Los Gatos, Calif.

[73] Assignee: Arrigoni Computer Graphics, Los Gatos, Calif.

[21] Appl. No.: 200,310

[22] Filed: Oct. 24, 1980

[51] Int. Cl.³ .......................... G08C 21/00; G02B 5/14
[52] U.S. Cl. ..................................... 178/18; 313/500; 313/113; 340/815.31; 350/96.15
[58] Field of Search ............................. 313/500, 113; 350/96.10, 96.15, 96.20; 340/380, 815.31, 712 S (U.S. only); 178/18, 19, 20

[56] References Cited

U.S. PATENT DOCUMENTS

| 3,174,144 | 3/1965 | O'Neill | 340/380 X |
| 3,307,175 | 2/1967 | Shill | 350/96.10 X |
| 3,510,732 | 5/1970 | Amans | 313/501 X |
| 3,876,900 | 4/1975 | Amatsuka et al. | 313/500 X |
| 4,151,582 | 4/1979 | Grunberger | 350/96.10 X |
| 4,339,200 | 7/1982 | Corbin | 350/96.10 X |

FOREIGN PATENT DOCUMENTS

888002  1/1962  United Kingdom .

Primary Examiner—Palmer C. Demeo
Attorney, Agent, or Firm—Alan H. MacPherson; Steven F. Caserza; Thomas S. MacDonald

[57] ABSTRACT

A structure for transmitting an optical signal which allows physical separation of the optical source from the point of optical output, thereby preventing noise or interference due to the optical source being located in the vicinity of sensitive electrical apparatus.

12 Claims, 16 Drawing Figures

| | | |
|---|---|---|
| REDRAW | ZOOM IN | SET ALIGN ON/OFF |
| SCALE DRAWING | SET WINDOW | DIGITIZER ON/OFF |
| SCREEN ONLY | SCREEN AND PLOTTER | PLOTTER ONLY |
| TUNE EDIT | EDIT PENS | USER KEYS |
| PEN #1 | PEN #2 | PEN #3 |
| SAVE DRAWING | WAIT | RETRIEVE FROM FILE |
| ERASE OBJECT | ERASE LAST OBJECT | ERASE ALL |
| ERASE LINE | ERASE LAST LINE | ERASE LINE PORTION |
| ERASE CONTIN- UOUS LINES | | |
| MOVE POINT | FIX ENDS | CURVE FIT  |

GENERAL DRAWING MENU Ø.1

FIG. 5a

| CONTINUOUS DRAW | MOVE AND DRAW | SIZE DASH |
|---|---|---|
| LINE  | LINE  | LINE  |
| LINE  | LINE  | DASHED CURVE ON/OFF |
| TRIANGLE  | PARALLELOGRAM  | CIRCLE  |
| ARC  | ELLIPSE  | CIRCLE  |
| PENTAGON  | HEXAGON  | OCTAGON  |
| ARROW  | ARROW  | BREAK LINE  |
| ARROW HEAD  | ARROW HEAD  | BREAK LINE  |
| MEASURE MARK  | MEASURE MARK  | GRID |

GENERAL DRAWING MENU Ø.1

APPARATUS FOR PREVENTING NOISE GENERATION IN AN ELECTRICAL DIGITIZER DUE TO GENERATION OF OPTICAL SIGNALS

BACKGROUND OF THE INVENTION

This invention relates to apparatus for generating an optical signal for use with a computer aided design system to identify a function being called from memory for use in the design while preventing the generation of noise due to the presence of optical generating apparatus, and more specifically to such a use in conjunction with an electrical digitizer.

DESCRIPTION OF THE PRIOR ART

Figure 1:
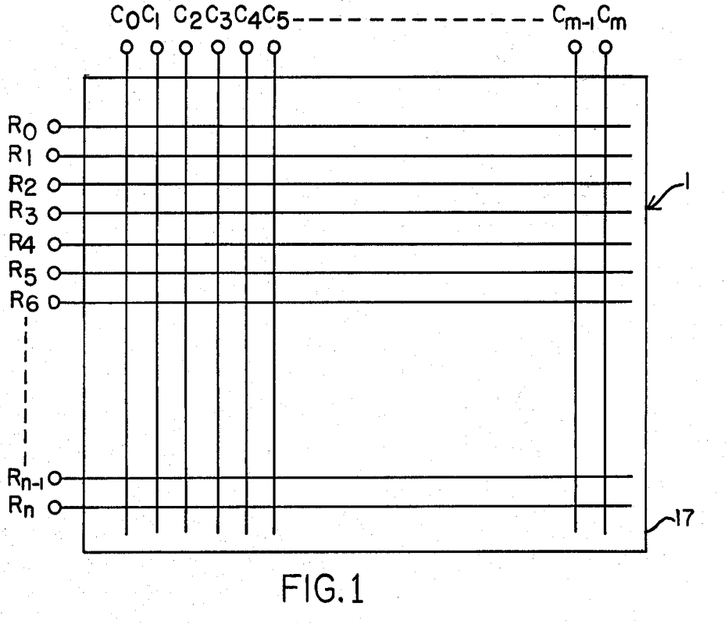
FIG. 1 is a schematic diagram of the matrix forming a prior art digitizer.

Electrical digitizers used in the conversion of a physical location to a set of numerical coordinates are well known in the prior art. A prior art digitizer is shown in FIG. 1. Digitizer 1 comprises a plurality of electrical conductors, such as wire forming substantially parallel rows $R_0-R_n$ located within frame 17a. Similarly, a plurality of substantially parallel columns $C_0-C_m$ are formed substantially perpendicular to rows $R_0-R_n$ within frame 17. Rows $R_0-R_n$ are accessed individually in sequence. Similarly, columns $C_0-C_m$ are accessed in sequence such that each column is accessed once during the accessing of each row. Thus, initially $R_0$ and $C_0$ will be accessed, then $R_0$ and $C_1$ will be accessed, followed by $R_0$ and $C_2$ through $R_0$ and $C_m$. At this time, row $R_1$ is accessed, along with column $C_0$.

Figures 2, 3:
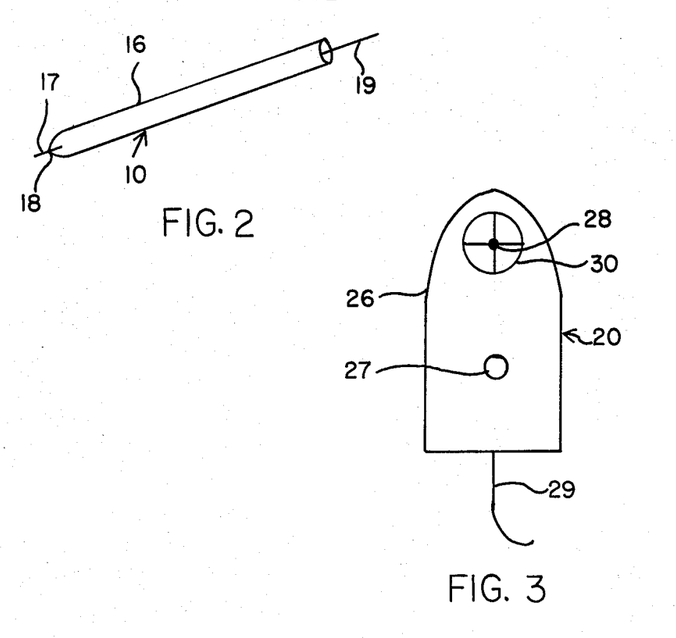
FIG. 2 depicts a stylus for use with the digitizer of FIG. 1.
FIG. 3 depicts a cursor for use with the digitizer of FIG. 1.

A stylus used in conjunction with digitizer 1 of FIG. 1 is shown in FIG. 2. Stylus 12 is comprised of body 16, which may be shaped as a pencil for ease of use. The body 16 contains tip 18, with switch means 17 being located at tip 18. When stylus 12 is placed on a digitizer at a desired location, switch means 17 is activated by the pressure exerted by the operator on stylus 12 against the surface of the digitizer. Tip 18, typically containing a wire loop, is activated by the closing of switch means 17 to become a functional receiving antenna. As each row and column in the digitizer of FIG. 1 is strobed, the intersection of the strobed column and the strobed row transmits an electromagnetic signal. All other locations within digitizer 1 do not transmit an electromagnetic signal. When the rows and columns are strobed in such a manner that the row-column intersection with the digitizer of FIG. 1 beneath tip 18 of stylus 12 becomes the transmitting antenna, receiving antenna 18 of stylus 12 of FIG. 2 will receive the electromagnetic signal transmitted by digitizer 1. This signal as received by receiving antenna of stylus 12 is transmitted via lead 19 of FIG. 2 to a computer system associated with the digitizer. In this manner, the computer may determine and store the precise location of the stylus on the digitizer, as represented by an intersection of a row and a column.

A cursor which serves essentially the same function as the stylus of FIG. 2 is shown in FIG. 3. Cursor 20 contains body 26, switch means 27, which is operator controlled, and a receiving antenna means 28 located at the intersection of cross-hairs 30. The cross-hairs 30 are positioned over a desired location on the digitizer of FIG. 1. When the proper combination of rows and columns is strobed, receiving antenna 28 receives the signal transmitted by digitizer 1 of FIG. 1, and this signal is transmitted to a computer associated with the digitizer via cursor lead 29.

Similarly, a stylus or cursor may be constructed such that each contains a transmitting antenna, and the digitizer acts as a receiving antenna at the intersection of the strobed column and the strobed row.

Figure 4:
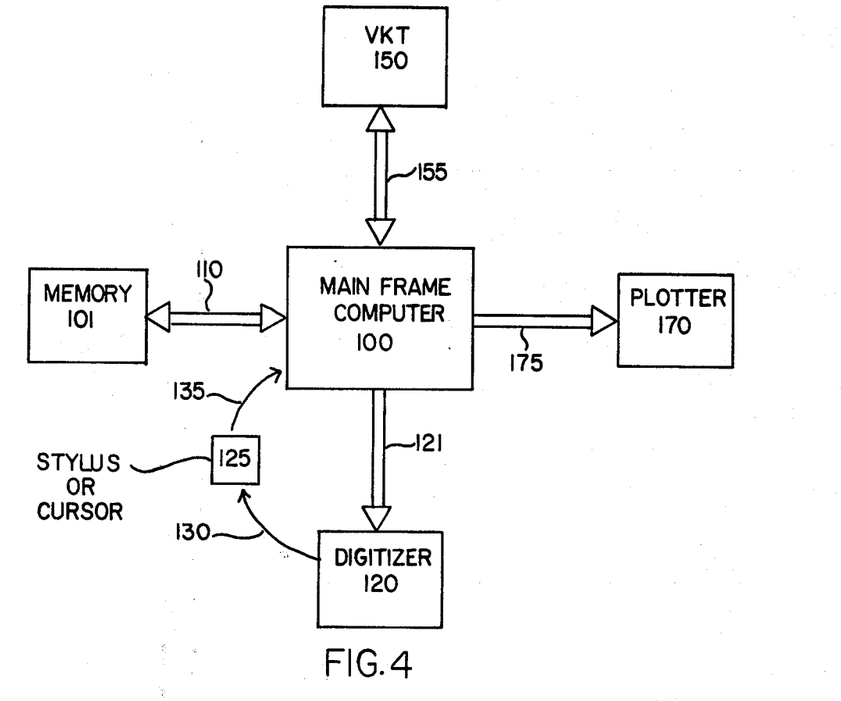
FIG. 4 is a block diagram of a complete operating system utilizing a digitizer for computer aided design.

A block diagram of a complete operating system utilizing a digitizer and a stylus or cursor is shown in FIG. 4. Mainframe computer 100 is connected to memory unit 101 via bus 110. Memory 101 may contain the software program used to run mainframe computer 100, as well as information generated during operation of the system. Mainframe computer 100 controls the strobing of digitizer 120, with strobe signals being transmitted from mainframe computer 100 to digitizer 120 via bus 121. Signals are transmitted from digitizer 120 to stylus 125 via electromagnetic transmission path 130, when the stylus or cursor 125 is positioned over a desired location on digitizer 120, and activated. The information received by stylus or cursor 125 from digitizer 120 is transmitted back to mainframe computer 100 via lead 135. In this manner, mainframe computer 100 applies strobe signals via bus 121 to digitizer 120. By positioning stylus or cursor 125 at a desired location on digitizer 120 and then activating stylus 125, an electromagnetic signal will be transmitted via transmission path 130 from digitizer 120 to stylus or cursor 125 when mainframe computer 100 strobes the row and column of digitizer 120 whose intersection lies beneath the position of stylus or cursor 125. The signal from stylus or cursor 125 is transmitted back to mainframe computer 100 via lead 135, thus informing mainframe computer 100 of the location of the row and column intersection located beneath stylus or cursor 125. Also connected to mainframe computer 100 is video keyboard terminal 150, which is connected via bus 155, and plotter 170 which is connected via bus 175. Computer instructions may be entered by the operator via VKT 150, and the result of the computer's operation may be printed on either plotter 170 via bus 175 or VKT 150 via bus 155.

Figure 5A:
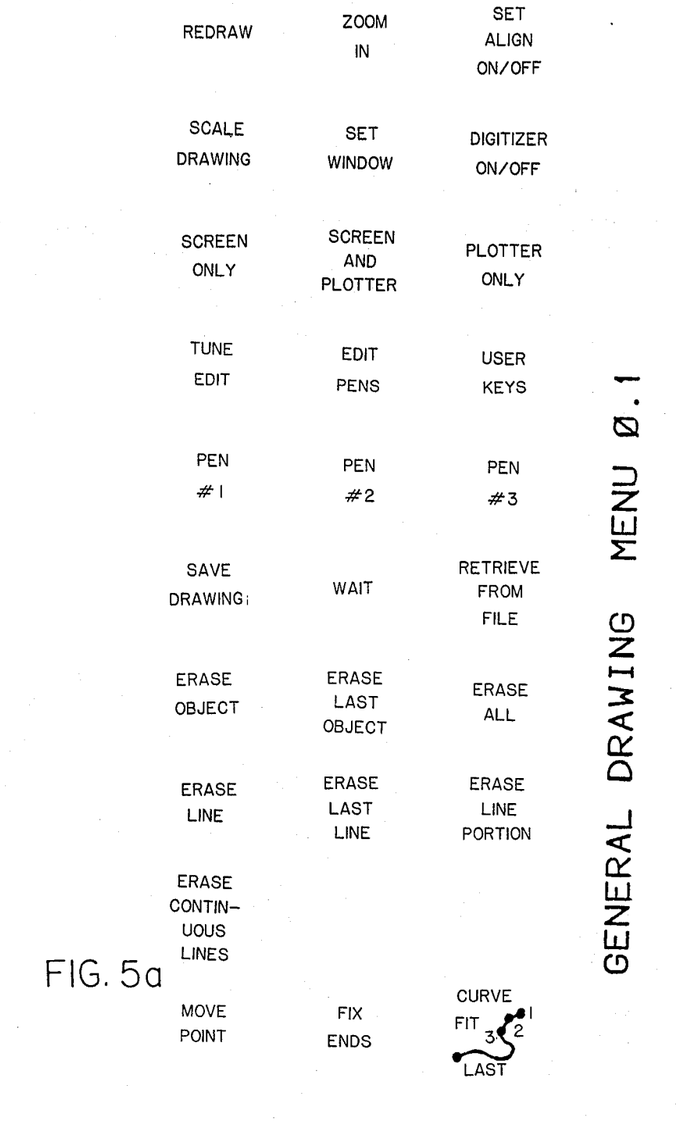
FIGS. 5a–5d are drawings of typical menus containing functions available in a typical computer aided design system.
Figure 5B:
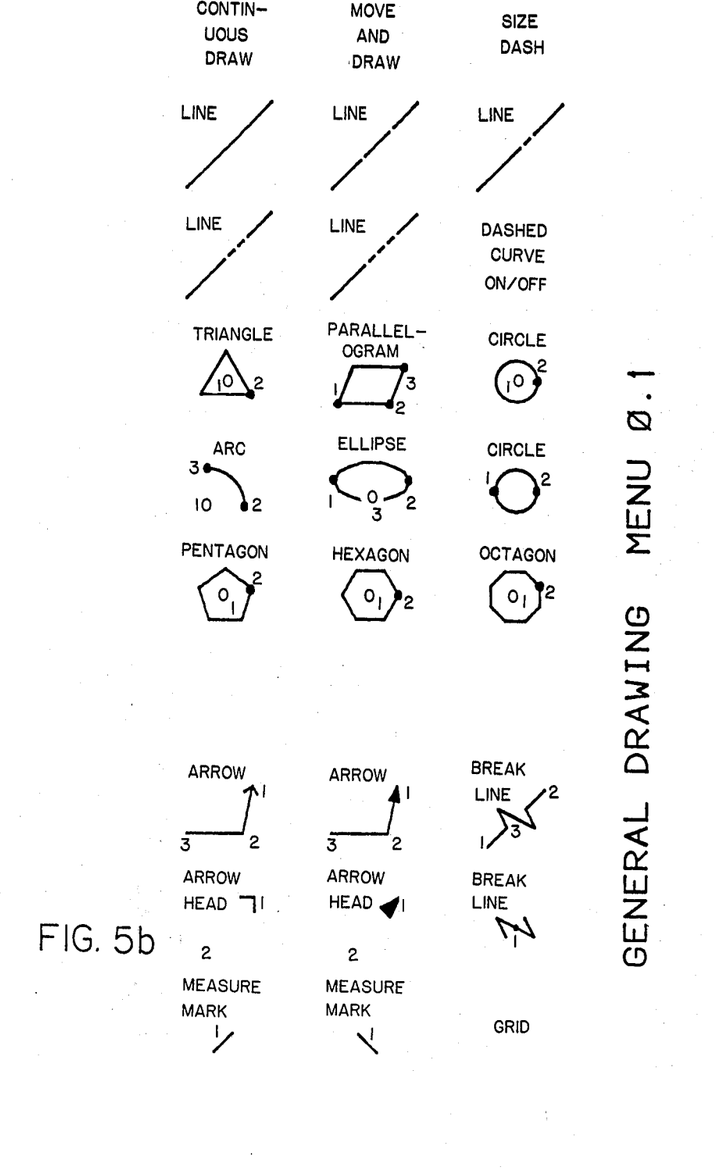
Figure 5C:
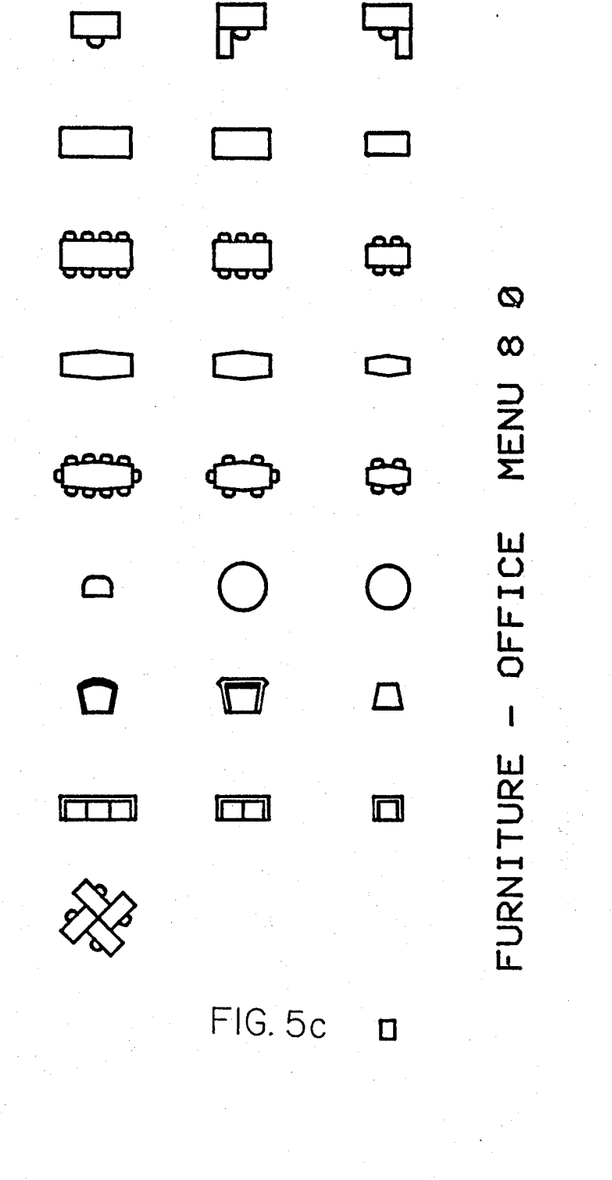
Figure 5D:
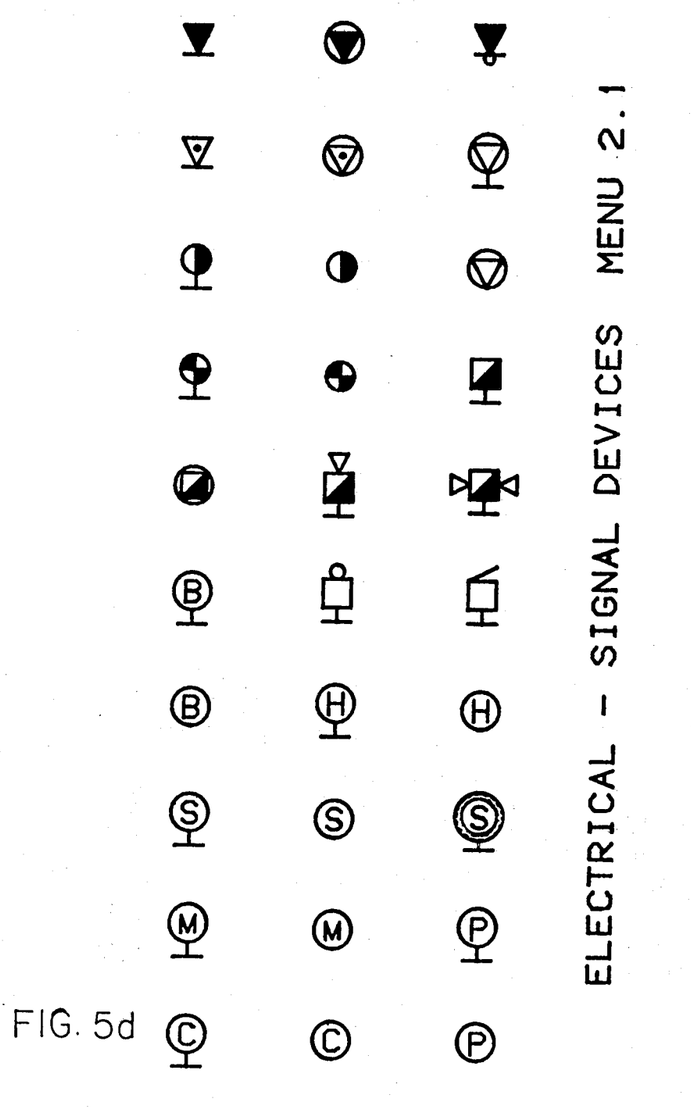
Figure 6:
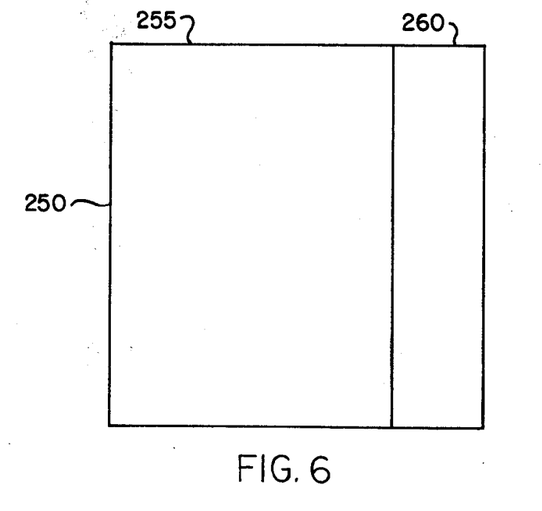
FIG. 6 is a diagram of a digitizer with a portion of the digitizer set aside for use as a menu section.

In a computer design system of use to assist in the design and layout of buildings and diagrams, etc., there are numerous standard tasks to be performed. Several of these tasks are shown in the menus of FIGS. 5a–5c. FIG. 5d shows symbols of use in electrical wiring layout for buildings. For example, in FIG. 5a, the operator has the choice of selecting either pen 1, pen 2, or pen 3. Similarly, the operator has the choice of having the output appear on the video keyboard terminal screen only, the plotter only, or both the screen and the plotter. Similarly, standard symbols may be selected, such as the various types of office furniture shown in FIG. 5c. One method of allowing the operator to select the various functions is via the video keyboard terminal. The system may be programmed to accept either a written description of each function, or a specific number assigned to each function. Another means for allowing the operator to input his selection of the desired function is to have a special keyboard constructed having a plurality of switches, each switch corresponding to a desired function. Each switch may be labelled with a written description of the function or a pictorial description of the function, such as a symbol indicative of what that function will produce on the output. Still another method of allowing the operator to select desired functions is to dedicate a portion of the digitizer for this use. Such an arrangement is shown in FIG. 6. As shown on FIG. 6, digitizer 250 contains menu section 260, specifically set aside for use as an input method where the operator is able to select desired, predefined, functions. The remainder of digitizer 150, labelled 255 in FIG. 6, is available for normal drawing functions. In a prior art method employing this scheme, menu section 260 is permanently covered with a label defining numerous functions, each function being located at unique intersections of the row-column matrix contained in the digitizer. In this manner, the operator need only activate the stylus above the location of a desired function, and the computer will be able to determine, as previously explained, the location of the stylus. The computer is then able to equate this stylus location with its associated function previously stored in the computer.

One problem with prior art systems is that there are numerous functions, and the operator, if interrupted, may easily forget which functions are selected for use unless there is a method of reminding him. One method of reminding the operator which functions have been selected is to provide a list of selected functions on the video keyboard terminal. This is disadvantageous in that the video keyboard terminal is typically used to show the operator the state of the drawing as it progresses, such that the more time consumming and expensive output available by the plotter is used only when the operator has completed his drawing. Another method of providing the operator with a reminder of which functions have been selected, is to provide an optical signal to illuminate each selected function which is contained on a keyboard comprised of a plurality of switches. However, this technique requires that the operator must look to a location separate from the digitizer where he is most often working. This takes time and is tiring. This also requires the use of an additional input switch terminal. There is no effective means of illuminating the functions contained on a system which utilizes a portion of the digitizer as its menu section, because the electro-magnetic radiation and absorption associated with a light source such as light emitting diodes or light bulbs located on the digitizer will prevent proper operation of the digitizer menu section when the stylus is activated to select a function. This is due to the fact that the electro-magnetic radiation and absorption from the additional wires used to operate the light source interfere with the transmission and reception of the electromagnetic signal between the stylus and the digitizer.

SUMMARY OF THE INVENTION

This invention overcomes difficulties in prior art methods of utilizing a portion of the digitizer as a menu board. In accordance with this invention, a novel arrangement of a series of light pipes is utilized to conduct an optical signal to a desired location in the menu section, located on a portion of the digitizer. These light pipes allow transmission of an optical signal from a source which is located sufficiently distant from the digitizer to prevent the light source from interfering with proper operation of the digitizer.

BRIEF DESCRIPTION OF THE DRAWING

FIG. 7b-1 shows in side view a structure for transmitting an optical signal in accordance with this invention.

FIG. 7b-2 shows in end view the structure shown in FIG. 7b-1.

FIG. 7c shows the bottom view of the structure shown in FIG. 7a.

FIG. 7d shows the exploded isometric view of the structure shown in FIG. 7a.

DETAILED DESCRIPTION OF THE INVENTION

Figure 7A:
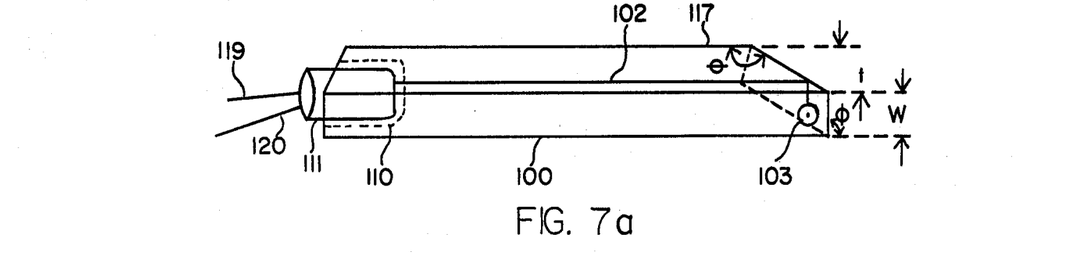
FIG. 7a shows in isometric view the light pipe structure of this invention.
Figure 7B:
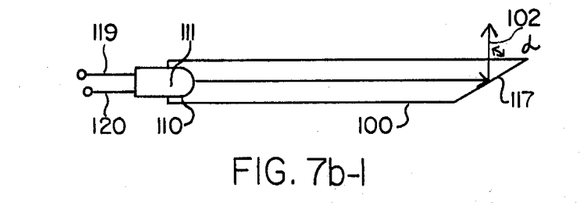
Figure 7B:
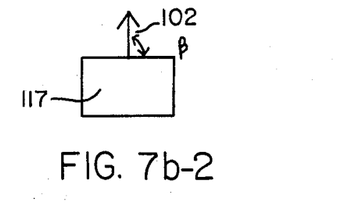
Figure 7C:
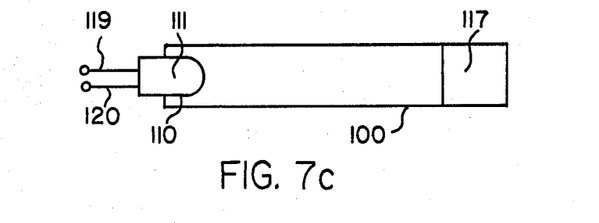
Figure 7D:
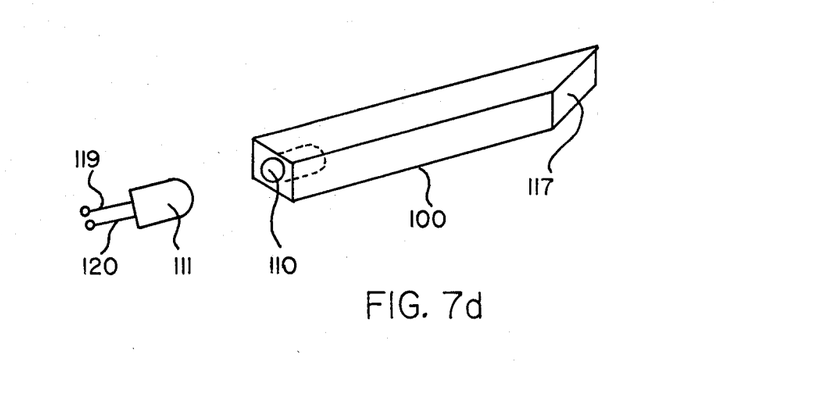

FIG. 7a shows the structure for transmitting an optical signal in accordance with this invention. Optical transmission means 100, having thickness t and width w, comprises a recess 110 for the physical placement of light source 111. Transmission means 100 also has beveled end 117 which serves as a means for reflecting light beam 102 from light source 111 such that light beam 102 is reflected off beveled surface 117 and is emitted from optical transmission means 100 at emission region 103. By constructing beveled end 117 with specific angles $\theta$ and $\phi$, as shown on FIG. 7a, the desired angles $\alpha$ of FIG. 7b-1 and $\beta$ of FIG. 7b-2 at which the optical signal is emitted from optical transmission region 100 at emission region 103 may be selected. In the preferred embodiment, $\alpha$ and $\beta$ are selected to provide the user with the most comfortable view of the optical signal. Also shown in FIG. 7b are leads 119 and 120 which provide power to light source 111. Light source 111 may be any structure capable of emitting light, including light emitting diodes, incandescent lamps, and gas discharge lamps. The most desireable construction of transmission means 100 is such that recess 110 is of such a size as to accept light source 111 with an interference fit, such that light source 111 simply has to be gently pressed into recess 110, with the interference fit providing sufficient friction to hold light source 111 in place.

Optical transmission means 100 may be made of any material whose refractive index is high compared with the refractive index of air. In this manner, light emitted from light source 111 will be confined to optical transmission means 100, in that any light which hits a surface of optical transmission means 100 will be reflected back within transmission means 100. In this manner, essentially all light emitted from light source 111 will emerge from region 103 as desired. Such materials whose refractive index is high compared with the refractive index of air include glass, mirrored glass, polystyrene and acrylic. Of these compounds, acrylic is preferred because by using acrylis optical transmission means 100 is constructed by a mold injection process, utilizing highly polished, chromeplated molds such that no finishing of optical transmission means 100 is required after molding. Acrylic is also very inexpensive, durable, and not prone to breakage, as is glass.

Of course, recess 110 is not required to be included in optical transmission means 100, if there is provided some external means to secure light source 111 in a fixed position relative to optical transmission means 100. However, the preferred method is to include recess 110, thereby providing an inexpensive and efficient interface between light source 111 and optical transmission means 100.

The color of the light emitted from optical transmission means 100 at region 103 may be any desired color. Methods of obtaining various colors include the use of light source 111 with the desired color, such as colored lamps or light emitting diodes which emit light of the desired color. Another method of obtaining a desired color at region 103 is to tint the material used to make optical transmission path 100.

Figure 8:
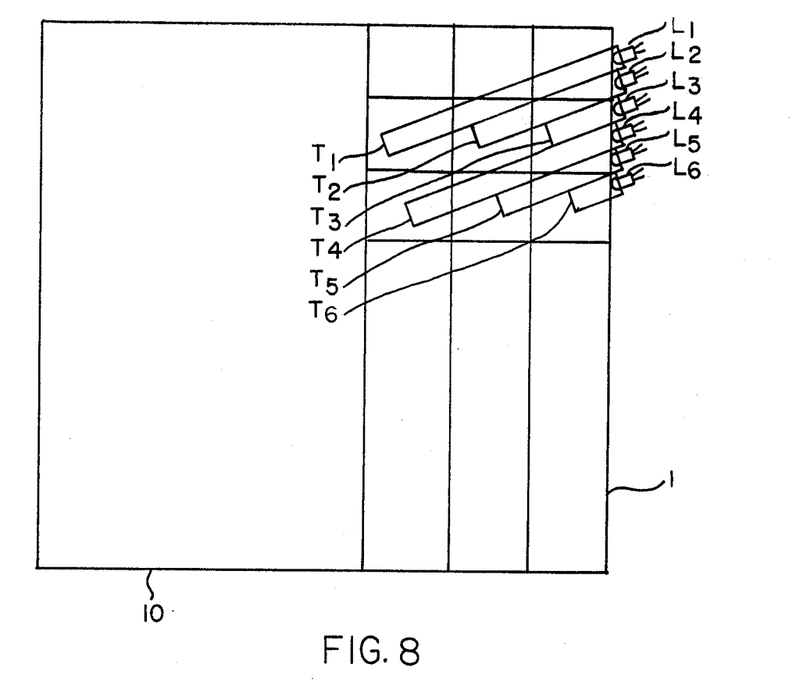
FIG. 8 is a drawing of the relationship between a digitizer, a menu section, and the structures for transmitting optical signals constructed in accordance with this invention.

The relationship between a digitizer, a menu section, and optical transmission paths constructed in accordance with this invention is shown in FIg. 8. A portion of digitizer 1 is used as a menu section 10. Within menu section 10, a plurality of optical transmission means, several of which are shown as $T_1$-$T_6$, are placed, thereby allowing various regions of manu section 10 to be illuminated as desired. Light sources $L_1$-$L_6$, associated with optical transmission means $T_1$-$T_6$ respectively, are also shown. In this manner, light sources $L_1$-$L_6$ may be kept at any desired distance from digitizer 1 simply by constructing transmission means $T_1$-$T_6$ to specific desired lengths. Generally, it is found that light sources, and other devices which may interfere with the transmission and reception of electromagnetic signals between digitizer 1 and the stylus should be kept at least 1 inch from digitizer 1. As shown in FIG. 8, lamps $L_1$-$L_6$ are kept at a distance of at least 1 inch from digitizer 1. Optical transmission means $T_1$-$T_6$ allows an optical signal to be emitted from the menu section 10 located within digitizer 1, thus preventing any interference with the electromagnetic transmission from digitizer 1. To select a desired function from menu section 10, the stylus is placed on that location of menu section 10 corresponding to the desired function, and the stylus is then activated. In order for the electromagnetic transmission between digitizer 1 and the stylus to take place, the stylus must be within approximately ⅜" from the surface of digitizer 1 to be activated. Thus, menu section 10, containing optical transmission means $T_1$-$T_6$, is constructed to a preset thickness of no more than ⅜" between the surface of the digitizer and the active portion of the stylus. When a desired function is selected, computer control means activate that light source corresponding to the selected function, thereby transmitting an optical signal through the optical transmission path associated with said activated light source, thereby illuminating that portion of the menu section 10 corresponding to the selected function. The operator then is able to determine that the proper functions have been selected and activated. Should the operator be interrupted, the previously selected functions remain lit thereby identifying for the operator the previously selected functions when the operator returns to design activities.

Figure 9:
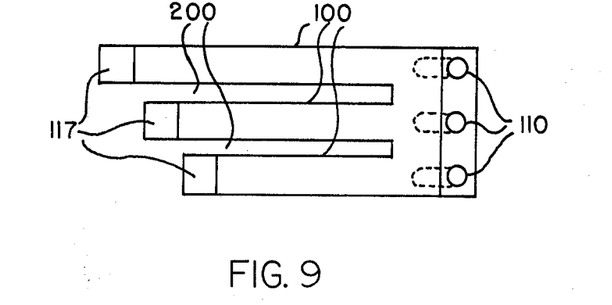
FIG. 9 shows the isometric view of a single structure capable of transmitting three distinct optical signals in accordance with this invention.

Thus, the optical transmission means of this invention allows light to be emitted from a portion of an electrical digitizer used as a menu section. This is in contrast to prior art techniques, where menu section contained on a digitizer could not be illuminated, due to the resulting interference with the stylus and the X,Y coordinate wires caused by the presence of the light source and associated wiring, which would prevent the digitizer from functioning. The optical transmission means of this invention are much superior to prior art optical transmission means such as fiber optics, in that they are much less expensive and less fragile. It has been estimated that a single fiber optic for use in this application capable of illuminating a single area of the menu section corresponding to a single selected function would cost approximately $25.00. In contrast, an optical transmission means of this invention suitable for the same purpose, having a thickness (t of FIG. 7a) of 0.2 inches and a width (w of FIG. 7a) of 0.25 inches, costs approximately $0.25 each. In addition the optical transmission means of this invention may be fabricated in essentially any desired shape, and may include a recess for the placement of the light source. Thus, the optical transmission means of this invention may be fabricated in a specific shape most useful in its own mounting within menu section 10. This reduces the cost of manufacturing the menu section over methods which would require additional mounting hardware. Furthermore, several optical transmission means may be fabricated as a single unit with air spaces 200 located between adjacent optical transmission means 100, as shown in FIG. 9, thus further simplifying mounting methods.

I claim:

1. In a digitizer having a menu section for selection of desired functions by a switch stylus/cursor at various locations in said section, an optical transmission means comprising a solid light pipe capable of transmitting light having a first end and a second end, including means situate outside said digitizer for emitting an optical signal into said first end;

said light pipe including said second end extending within the menu section of said digitizer;

means for reflecting said optical signal at said second end; and an emission region located on an exterior surface of said light pipe, wherein said optical signal reflected from said means for reflecting is transmitted through said emission region from the interior of said light pipe to illuminate a particular location on said menu section.

2. Structure as in claim 1 in which said light pipe has a substantially rectangular cross section perpendicular to the path of said optical signal between said first end and said reflecting end.

3. Structure as in claim 2 wherein said first end is adapted for the mechanical attachment of a source of said optical signal.

4. Structure as in claim 3 wherein said first end includes a recess for the insertion of said optical source.

5. Structure as in claim 4 wherein said recess for insertion provides an interference fit with said optical source.

6. Structure as in claim 5 wherein said light pipe is molded around said optical source whereby said optical source is integrally united with said light pipe.

7. Structure as in claim 6, wherein said light pipe is fabricated of a material which has a refractive index which is high compared to the refractive index of air.

8. Structure as in claim 7 wherein said material is acrylic.

9. Structure as in claim 8 wherein said acrylic is tinted to provide an optical signal of a desired color at said emission region.

10. Structure as in claim 9 wherein said optical source is selected from the group of optical sources consisting of light emitting diodes, incandescent lamps, and gas discharge lamps.

11. In a digitizer having a menu section for selection of desired functions by a switch stylus/cursor at various locations in said section, an optical transmission means comprising a solid light pipe having a receiver end situate outside said digitizer and adapted for the reception of an optical signal and a light emitting second end, opposite said receiver end, and extending within the menu section of said digitizer which illuminates a particular location on said menu section.

12. Structure as in claim 11 comprising a plurality of integral light pipes having a common base, each of said plurality of light pipes being cantilevered and having a different length so that the light emitting end of each light pipe is juxtaposed to a different location on said menu section, said common base including means exterior of said digitizer to mount a light source to provide said optical signal.

* * * * *